April 28, 1931.  N. A. WAHLBERG  1,802,743

TRANSMISSION LINE DEVICE

Filed Aug. 11, 1927

INVENTOR
Nils A. Wahlberg
BY
ATTORNEY

Patented Apr. 28, 1931

1,802,743

UNITED STATES PATENT OFFICE

NILS A. WAHLBERG, OF WILKINSBURG, PENNSYLVANIA, ASSIGNOR TO WESTINGHOUSE ELECTRIC & MANUFACTURING COMPANY, A CORPORATION OF PENNSYLVANIA

TRANSMISSION-LINE DEVICE

Application filed August 11, 1927. Serial No. 212,196.

My invention relates to transmission-line devices and particularly to electrostatic-field-controlling devices for association with suspension clamps and insulators.

One object of my invention is to provide a field-control device, of the above-indicated character, that shall be supported by, and embody an element disposed partially on each side of, the suspension clamp to simplify the structure and render it better balanced.

Another object of my invention is to provide an electrostatic-field-controlling device that shall embody an annular arc assuming portion which may be placed around a suspension insulator, while the latter is mounted in operative position.

Another object of my invention is to provide an electrostatic-field-controlling device that shall be held in operative position by portions of a standard suspension clamp.

A further object of my invention is to provide an electrostatic-field-controlling device that shall be simple and durable in consrtuction, economical to manufacture and effective in its operation.

In electrostatic-field-controlling devices, such as arcing rings, by reason of the positions and service requirements of certain of the parts, difficulties arise in economically providing effective structures of ready mounting and that endure all of the service conditions for which they are intended.

In an arcing ring that is adapted for positioning around, and in relatively greatly spaced relation to, a suspension insulator and that is intended to symmetrically direct and distribute the field, complication and expense sometimes occur in attaching radial or inwardly projecting supporting means thereto. Difficulty is also encountered in attaching the supporting means to the insulator or to the clamp in a simple and effective manner.

In practicing my invention, I provide an electrostatic-field-controlling device that embodies a halved annular or ring-like arc-assuming portion, and a support therefor that extends between opposite portions on the annular member, through a position under, and across, the suspension clamp, to which it is attached by members already on the clamp, to overcome the above-mentioned objections and to provide a device of simple and economical manufacture, ready assembly and mounting and effective operation.

Figure 1 of the accompanying drawings is a top plan view of a transmission-line device constructed in accordance with my invention.

Figure 1:
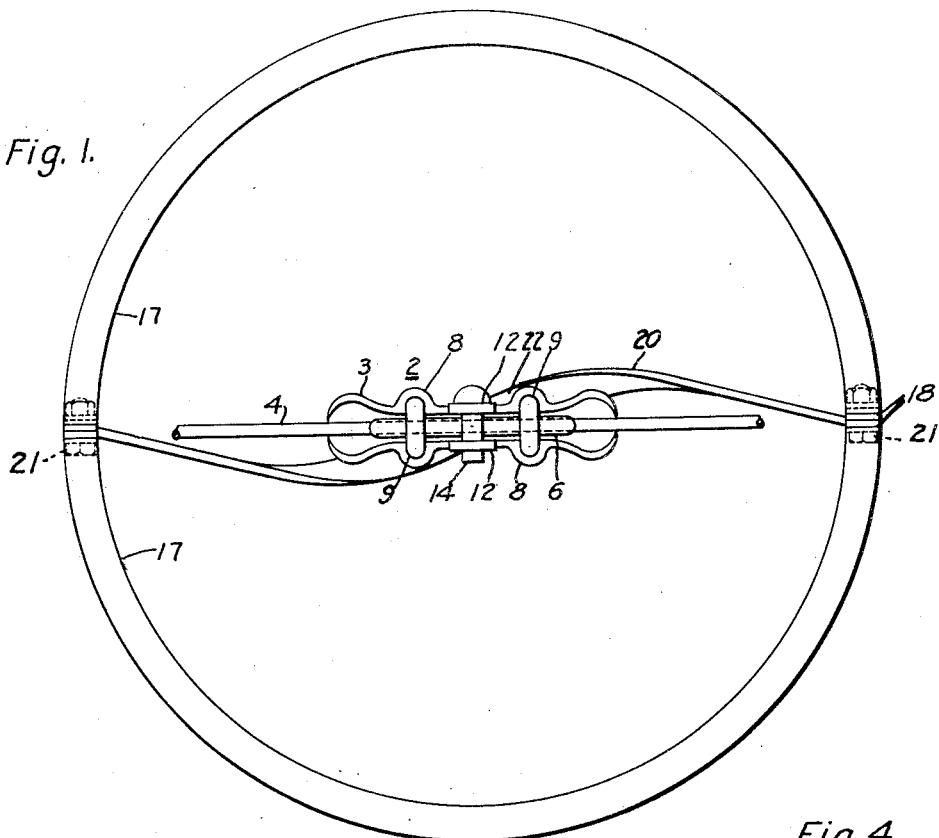
Figure 3:
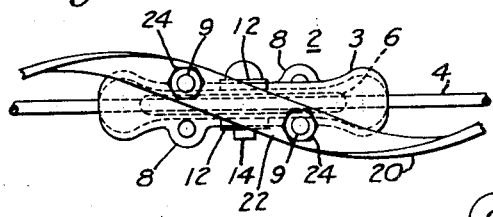
Fig. 3 is a bottom plan view of a portion of the device shown in Figs. 1 and 2.
Figure 4:
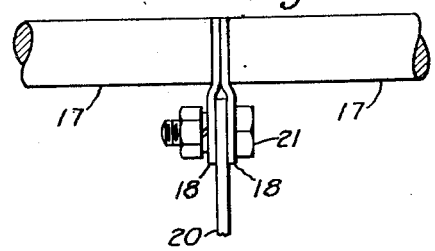
Fig. 4 is an enlarged detail elevational view of a portion of the device, shown in Figs. 1 and 2, taken at right angles to Fig. 2.
Figure 2:
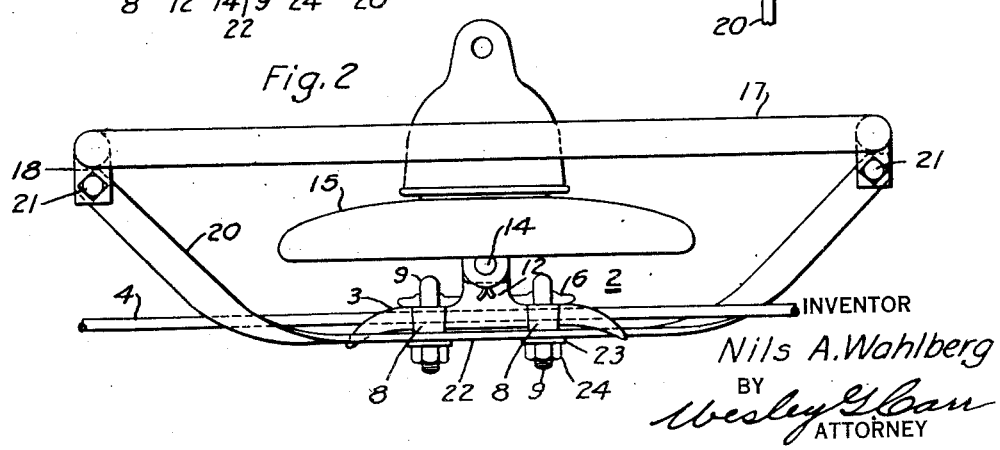
Fig. 2 is a side elevational view of the device shown in Fig. 1 and the bottom unit of a flexibly-connected series-unit suspension insulator associated therewith.

A suspension clamp 2, of a form heretofore suggested, comprises a channel or conductor-receiving member 3 for the reception of a conductor 4, and a clamping-shoe member 6. The channel member 3 comprises apertured side lugs 8 for the reception of U-bolts 9 for holding the clamping shoe 6 in position. The member 3 further comprises upwardly projecting clevis portions 12 for attachment, as by a pin 14, to the pin of an insulator 15 of the cap-and-pin type. The latter may be the bottom unit of a flexibly-connected series of similar units that is connected, at its upper end, to a main support, such as a tower.

An electrostatic-field-controlling device, ot my invention, comprises an annular arc-assuming member embodying separable half portions 17 that are divided along a diameter thereof extending substantially parallel to the conductor 4 above the latter.

The half portions 17 are provided, adjacent to the ends thereof, with strap-like depending lug portions 18 for the reception therebetween of a supporting element 20 to which they are attached, as by bolts 21.

The supporting element 20 is preferably constructed as a single portion of strap-like material that is twisted, as shown, to extend between the oppositely disposed end portions of the members 17 in substantially a vertical plane, through a position under and across the clamp 2 in a horizontal plane at right angles to the plane of its ends. Longitudinally-spaced openings, in the intermediate, or horizontal-plane, portion 22 of the supporting member 20, adapt the latter for the reception of one end of each of the bolts 9, whereby the member 20, the bolt 9 and the clamping shoe 6 may be held in position by lock washers 23 and nuts 24.

By my invention, by reason of the simple form of the parts employed, and their relation to each other, a structure of exceedingly simple and economical manufacture, ready assembly and mounting and effective operation is provided that has other advantages and is an improvement, in general, over similar structures in the service for which it is intended.

While I have shown and described a particular form of my invention, changes may be effected therein without departing from the spirit and scope thereof, as set forth in the appended claims.

I claim as my invention:

1. A transmission-line device comprising a conductor-supporting suspension clamp and an electrostatic-field-controlling structure including a strap-metal element twisted to extend between opposite positions above the conductor substantially on a line parallel to the conductor, through a position crossing the conductor under the clamp.

2. A transmission-line device comprising a conductor-supporting suspension clamp and an electrostatic-field controlling structure including a strap-metal element twisted to extend between opposite positions above the conductor substantially in line parallel to the conductor, through a position crossing the conductor under the clamp, said element having end portions in substantially the same plane and an intermediate portion in a plane at right angles to said first plane.

In testimony whereof, I have hereunto subscribed my name this 4th day of August, 1927.

NILS A. WAHLBERG.